Jan. 13, 1959 — H. C. VERNON — 2,868,708
NEUTRONIC REACTORS
Filed Nov. 2, 1945 — 7 Sheets-Sheet 7

Witnesses:
Herbert E. Metcalf
Walter L. Schlegel, Jr.

Inventor:
Harcourt C. Vernon
By: Robert A. Saunders
Attorney

United States Patent Office 2,868,708
Patented Jan. 13, 1959

2,868,708

NEUTRONIC REACTOR

Harcourt C. Vernon, Wilmington, Del., assignor to the United States of America as represented by the United States Atomic Energy Commission Application November 2, 1945, Serial No. 626,381

5 Claims. (Cl. 204—193.2)

This invention relates to neutronic reactors and to novel articles of manufacture used in and in combination with such reactors. In neutronic reactors a neutron fissionable isotope such as $U^{233}$, $U^{235}$, or $94^{239}$ or mixtures thereof is subjected to fission by absorption of neutrons, and a self-sustaining chain reaction is established by the neutrons evolved by the fission.

In general such reactors comprise bodies of compositions containing such fissionable material, for example, natural uranium, disposed in a neutron slowing material which slows the neutrons to thermal energies. Such a slowing material is termed a neutron moderator. Carbon, beryllium, and $D_2O$ (heavy water) are typical moderators sutiable for such use. Heat is evolved during the reaction which is removed by passage of a coolant through the reactor or in heat exchange relationship therewith. Specific details of the theory and essential characteristics of such reactors are set forth in copending application of Enrico Fermi and Leo Szilard, Serial No. 568,904, filed December 19, 1944, now Patent No. 2,708,656.

As pointed out in the above identified application it is advantageous to construct the reactor using lumps or aggregates of uranium in order to minimize excessive absorption of neutrons by $U^{238}$. Moreover cooled reactors are provided with conduits and protective coatings for the fissionable bodies made of a low neutron absorbing nonfissioning metal. The amount of such metal must be carefully controlled since if the amount is excessive the neutron chain reaction does not occur.

An object of the invention is to provide a new type of neutronic reactor in which fissionable bodies are supported within a neutron moderator, such as heavy water, and are cooled by a fluid passing through the reactor in spaced relationship to said moderator and in heat exchange relation with said members and wherein the construction is such that a minimum of non-fissionable material is used as construction material in the reactor.

A further object of the invention is to provide a reactor wherein the fissionable material is distributed in the moderator in the general form of layers which essentially separate sections of moderator from other sections thereof.

Other objects and advantages of the invention will be readily apparent to those skilled in the art from a consideration of the following disclosure and the appended drawings, the invention being limited solely by the scope of the claims.

Figure 3:
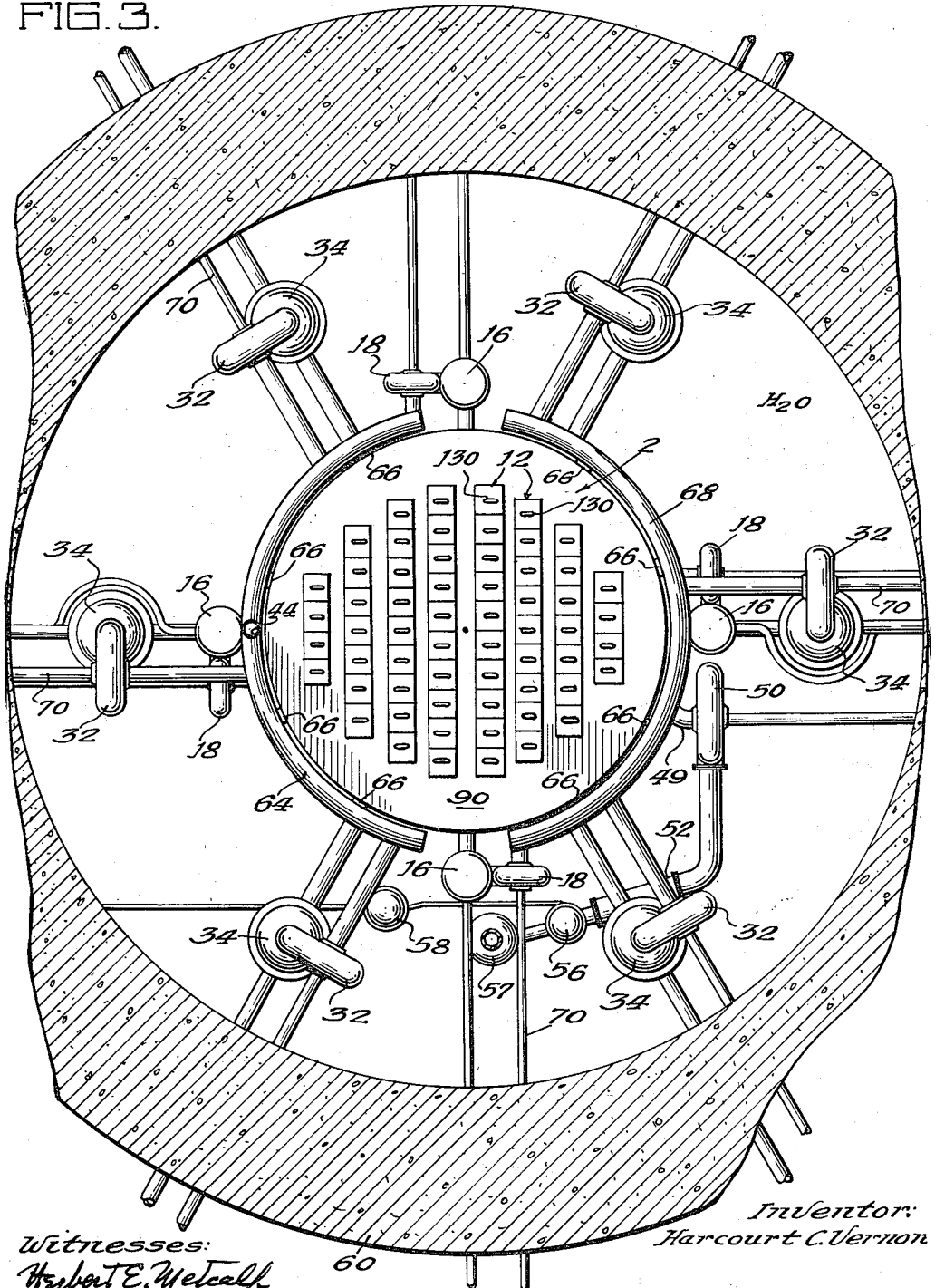
Fig. 3 is a sectional view through the system with the reactor tank and associated apparatus taken on line 3—3 of Fig. 2 and showing a portion of the apparatus in top plan view.
Figure 4:
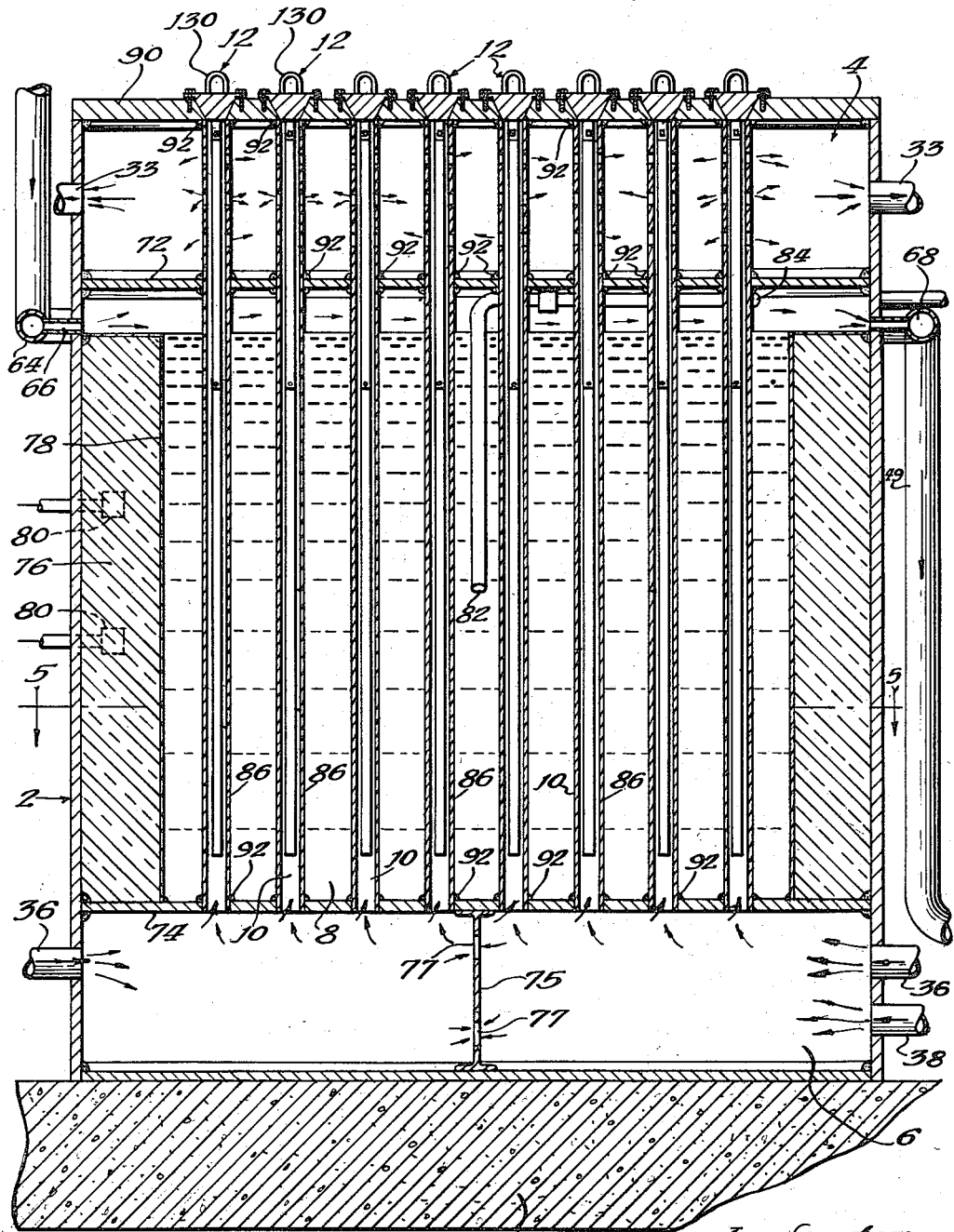
Fig. 4 is a sectional view taken in a vertical plane approximately bisecting the reactor tank or chamber.
Figure 5:
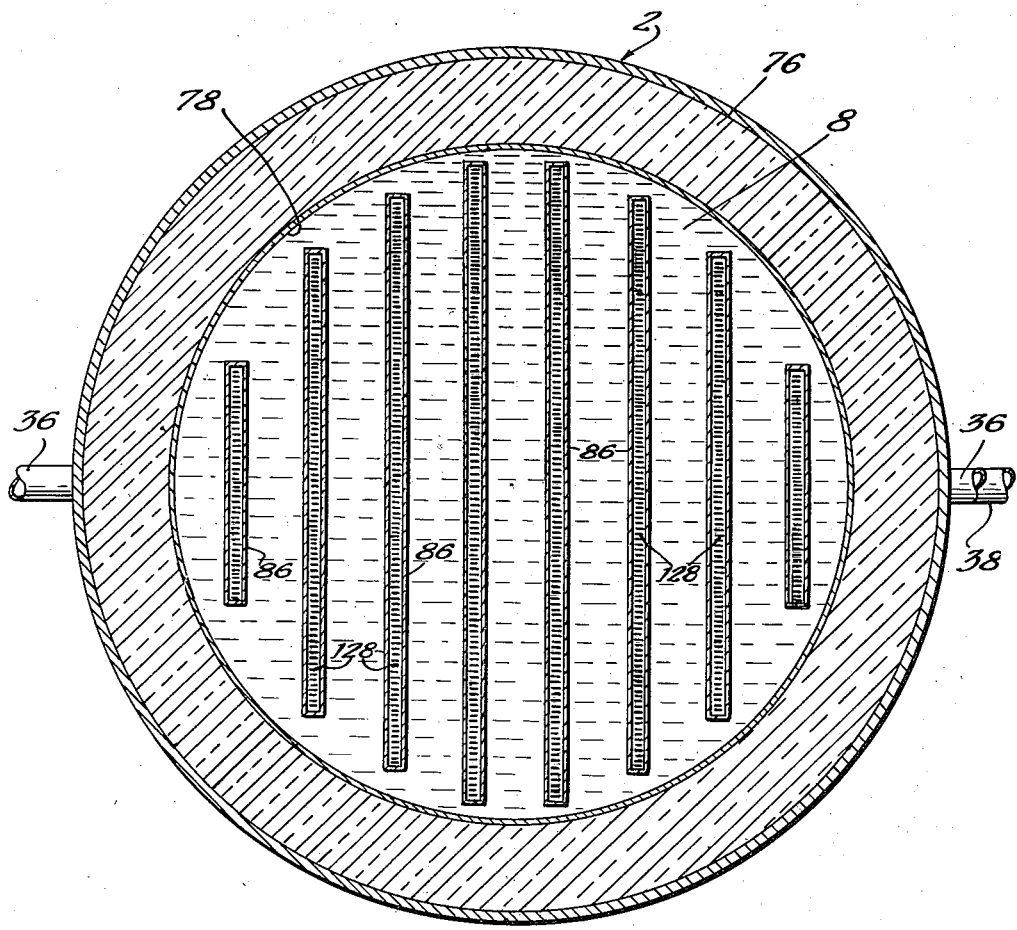
Fig. 5 is a sectional view taken in the horizontal plane indicated by the line 5—5 of Fig. 4.
Figure 6:
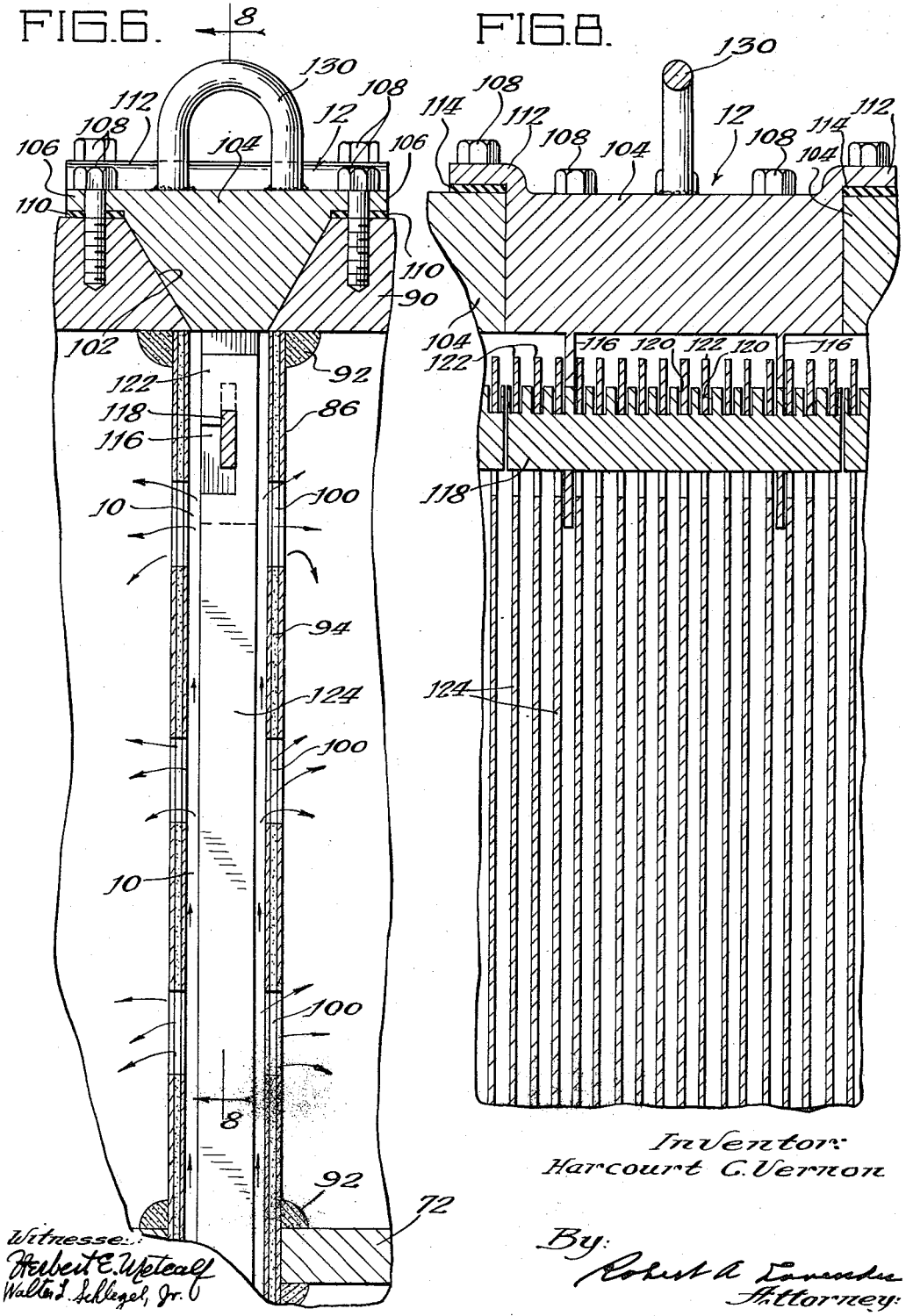
Figure 7:
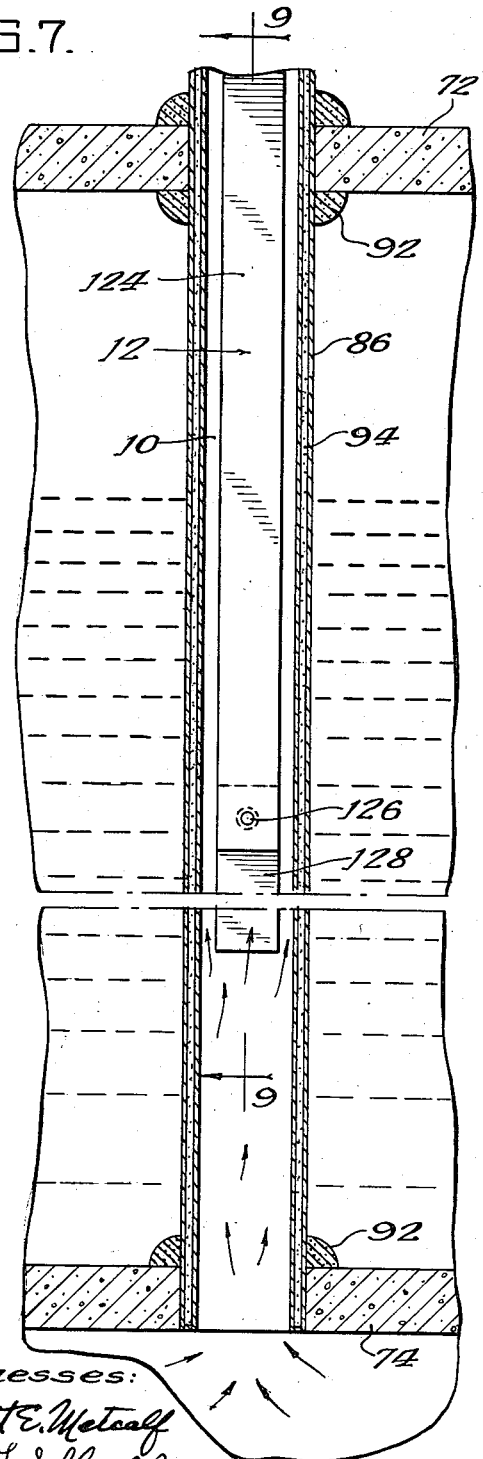
Figure 9:
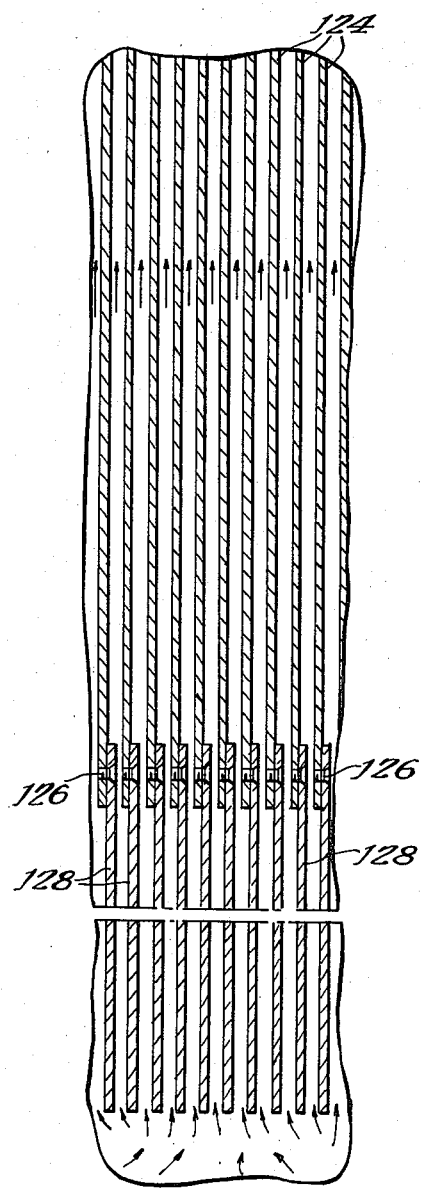

Figs. 6 and 7 are fragmentary enlarged sectional views illustrating, respectively, the upper and lower extremities of one of the uranium rod assemblies shown in Figs. 3 to 5; and Figs. 8 and 9 are sectional views taken, respectively, on the lines 8—8 of Fig. 6 and 9—9 of Fig. 7.

Briefly the neutronic reactor herein contemplated comprises a body of neutron moderator preferably a liquid moderator which is roughly subdivided by cells extending across the moderator. These cells contain fissionable bodies removably mounted therein. Separate means are provided for removing heat from the moderator and fissionable bodies and means are provided to minimize heat transfer to the moderator from the fissionable bodies. To permit use of cells having walls of minimum thickness means are provided to establish substantially equal pressures on the opposite sides thereof.

Figure 1:
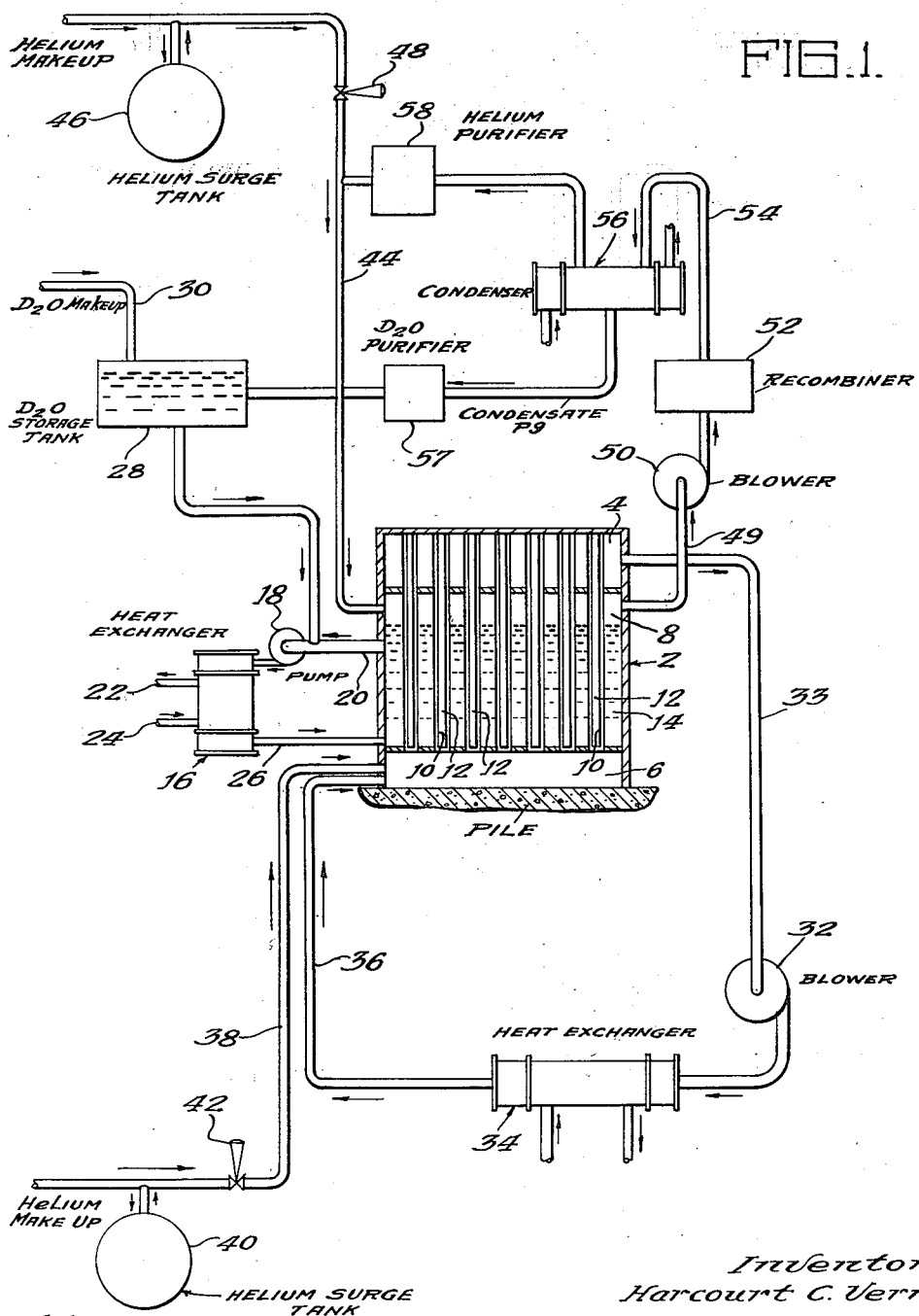
Fig. 1 is a flow diagram of a system embodying the invention.

Describing the invention in detail and referring first to Fig. 1, the system comprises a reactor tank 2, preferably of aluminum or stainless steel and comprising top and bottom chambers 4 and 6 and an intermediate chamber 8, the chambers 4 and 6 being connected by vertical channels 10, 10 within which are suspended units or assemblies 12, 12 of plates containing uranium or other fissionable material.

The chamber 8 contains a body 14 of liquid neutron moderator, such as heavy water ($D_2O$), which is circulated through a heat exchanger 16 by a pump 18 having its suction side connected to an outlet line 20. The liquid moderator is cooled within the exchanger 16 by passing therethrough in heat exchange relationship with a coolant, such as ordinary water, circulated through inlet and outlet pipes 22 and 24, respectively, and the cooled moderator is then conveyed to the chamber 8 through the return line 26. A moderator reservoir 28 is connected to the line 20 and to a supply or makeup line 30. It will be understood, as hereinafter more fully discussed, that in actual practice a plurality of heat exchangers 16, 16 and associated pumps 18, 18 are utilized to continuously cool the liquid moderator 14.

A fluid coolant, such as helium under pressure, is circulated through the channels 10, 10 by a pump or blower 32, having its suction side connected to the chamber 4 through an outlet line 33, said blower having its discharge side connected to a heat exchanger 34, the cooled helium being conveyed from the heat exchanger 34 to the chamber 6 through a return line 36. A helium makeup or supply line 38 comprising a surge tank 40 is connected to the chamber 6 and comprises an operating valve 42 which may be opened when desired for the purpose of maintaining a predetermined pressure usually not over about 147 pounds per square inch within the chambers 4 and 6 and within the channels 10, 10.

The pressure of the helium coolant within the channels 10, 10 is substantially equalized by pressure developed within the chamber 8 by means of a sweeping system hereinafter described, said system comprising an inlet or supply line 44 including a surge tank 46 connected to the chamber 8 through an operating valve 48. Helium is conveyed from the top of the chamber 8 by an outlet line 49 comprising a pump or blower 50, having its discharge side connected to a conventional recombiner device 52 adapted to recombine deuterium and oxygen swept from the top of the chamber 8 by the helium passing therethrough. It will be understood that the heavy water or deuterium oxide 14 within the chamber 8 is decomposed as a result of the neutronic reaction therein, and the decomposition products, deuterium and oxygen, are swept from the top of the chamber 8 by the helium circulated therethrough, and are recombined by conventional means for combining hydrogen and oxygen within the device 52 from which the gaseous heavy water is conveyed by a line 54 to a condenser 56. The condensed heavy water is conveyed from the condenser 56 to the before mentioned reservoir 28 after passing through a purifier 57 which may be a still, and helium gas is conveyed from the condenser through a helium purifier 58 to the helium inlet or supply line 44. Thus, helium gas is continuously circulated under pressure through the chamber 8 to equalize the pressure within the channels 10, 10 and to sweep from the chamber 8 deuterium and oxygen formed as decomposition products of the heavy water neutron moderator.

Figure 2:
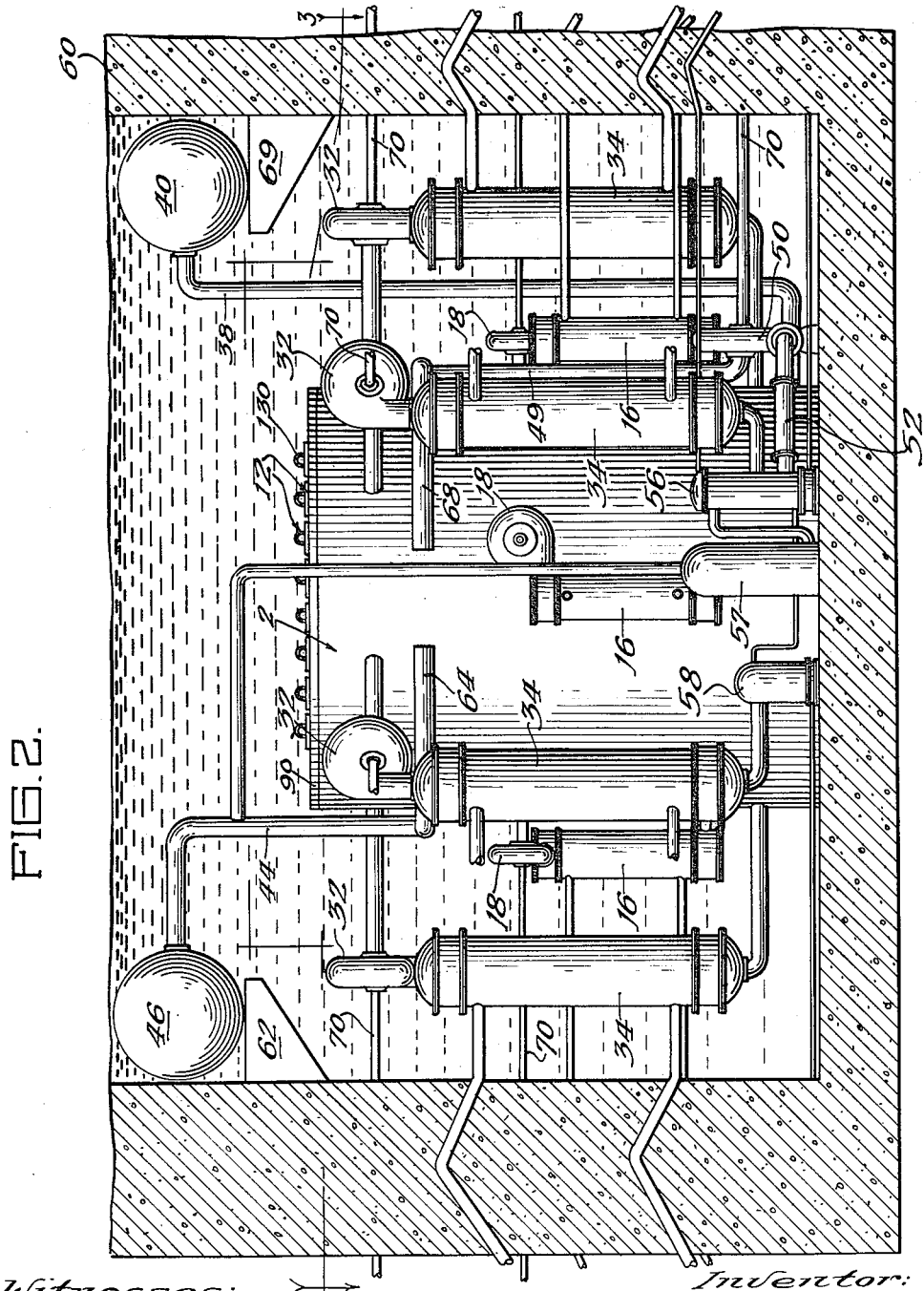
Fig. 2 is a sectional view through the system with the reactor tank and associated apparatus shown in elevation.

Referring now to Figs. 2 and 3, it will be seen that the reactor tank 2 is enclosed within a concrete vault or chamber 60 filled with ordinary water to afford a shield adapted to absorb emanations from the reactor within the bank 2. In the illustrated embodiment six of the before mentioned heat exchangers 34, 34 and associated pumps or blowers 32, 32 are arranged about the tank 2 for circulating coolant helium therethrough, and four of the before mentioned heat exchangers 16, 16 and associated pumps 18, 18 are arranged about the tank 2 for circulating the heavy water moderator 14 through the central chamber 8.

The surge tank 46 for the helium inlet line 44 is supported on a ledge 62 within the vault 60, and the inlet line 44 is connected to a header pipe 64 having a plurality of inlets 66, 66 (Figs. 3 and 4) communicating with the chamber 8. The outlet line 49 is connected to the chamber 8 by a header pipe 68 similar to the before mentioned pipe 64, said outlet line being connected to the blower 50 which discharges into the before mentioned recombiner device 52. The device 52, as discussed above, discharges into the condenser 56 from which condensed heavy water and helium are conveyed, respectively, to the heavy water and helium purifiers 57 and 58.

The surge tank 40 of the helium makeup line 38 is supported on a ledge 69 (Fig. 2) similar to the ledge 60 which supports the surge tank 46.

It may be noted that each of the pumps 18, 32 and 50 are operated by rotor means (not shown) extending through a tube or housing 70.

Referring now to Figs. 4 and 5 wherein the reactor tank 2 is shown in detail, it will be seen that the tank is a pressure vessel constructed of a low neutron absorbing material, such as aluminum, and divided by top and bottom partitions 72 and 74, respectively, into the before mentioned chambers 4, 6 and 8, the bottom partition being reinforced by a brace or beam 75 having openings 77, 77 therethrough to accommodate passage of helium.

Within the chamber 8 is a neutron reflector 76 which may be formed of graphite blocks spaced from the heavy water moderator by an aluminum liner 78, said reflector serving to reduce neutron losses from the periphery of the reactor by reflecting escaping neutrons back into the interior thereof.

One or more ionization chambers 80 are disposed within the reflector 76, and are preferably connected to means (not shown) for indicating the neutron density within the chamber 8, said density being controlled by a control rod 82 comprising or containing cadmium, boron or other neutron absorbent material, as more fully discussed in the above mentioned copending application. It may be noted that the control rod 82, as illustrated, is an angular member, the horizontal leg 84 of which is adapted to be rotated about its longitudinal axis thereby raising or lowering the angularly disposed portion of the rod within the reactor tank.

The before mentioned channels 10, 10 as may be clearly seen in Figs. 4 and 5, are formed in channeled elements in the form of elongated containers or vessels 86, 86 which extend through the partitions 72 and 74, and are preferably secured thereto and to the top wall 90 of the tank 2 by welding as at 92, 92 (Fig. 4).

Figs. 6 to 9, inclusive, illustrate in detail the vessels 86 and the fissionable units 12, 12 as well as the manner in which the latter are supported by the top wall 90 of the tank 2. It will be understood from a consideration of these figures that each container 86 is a double-walled vessel of aluminum or other neutron permeable material with heat insulating means 94 (Figs. 6 and 7) such as aluminum foil or powdered graphite between the inner and outer walls of the container which is provided with openings 100, 100 (Fig. 6) therethrough above the partition 72 to accommodate the flow of helium coolant through the channel 10 into the chamber 4 for the purpose heretofore discussed.

The top wall 90 of the tank 2 is provided with an elongated slot 102 (Fig. 6) communicating with the upper extremity of each channel 10, and this slot is closed during operation of the reactor by the units 12, 12 which comprise a series of cover plates 104, 104 (Figs. 6 and 8) of nonfissionable material which are flanged at opposite sides thereof as at 106, 106 (Fig. 6) to afford convenient connection as by stud bolts 108, 108 to the wall 90, resilient sealing means 110, 110 being interposed between the flanges 106, 106 and the wall 90. Alternate plates 104, 104 are flanged at the ends thereof as at 112, 112, and sealing means 114, 114 are provided between the flanges 112, 112 and the adjacent plates 104, 104 to prevent leakage of helium from between the plates.

The bottom of each plate 104 is provided with spaced depending lugs 116, 116 which are perforated to accommodate the slidable reception of a support bar 118 having notches 120, 120 (Fig. 8) in its upper edge for the reception of the hook-like upper extremities 122, 122 of support plates 124, 124 preferably formed of aluminum or other neutron permeable material having the characteristic of relatively low neutron absorption. Connected to the lower ends of the plates 124, 124 as by rivets 126, 126 are plates 128, 128 of fissionable material, for example, uranium metal or a uranium alloy or uranium compound such as uranium carbide.

Thus, it will be understood that each cover plate 104 and associated plates 128, 128 constitute a unit or assembly 12 which may be removed from the top of the associated channel 10 by means of a handle 130 on the cover plate 104, whereupon the plates 128, 128 and their supporting plates 124, 124 may be disconnected from the support bar 118 for the purpose of facilitating handling of the plates 128, 128 to recover the element 94, and fission fragments formed as a result of the neutronic reaction, as more fully discussed in the above mentioned copending application.

The number of the units disposed in the reactor tank should be sufficient to ensure establishment of a neutron self-sustaining chain reaction when the control rod or rods are removed and the neutron absorption of the control rods should be sufficient to prevent the chain reaction from occurring. The reaction is initiated by rotating the control rod or rods about its longitudinal axis thereby removing the rod from the central portion of the liquid moderator. After the neutron density is allowed to rise to the desired level the rod is reinserted to a point where the neutron reproduction ratio is unity and the reaction continued, until it is desired to stop it at which time the control rod may be lowered.

While the theory of the nuclear chain fission mechanism in uranium set forth herein is based on the best presently known experimental evidence, we do not wish to be bound thereby, as additional experimental data later discovered may modify the theory disclosed. Any such modification of theory, however, will in no way affect the results to be obtained in the practice of the invention herein described and claimed.

Obviously, many modifications may be made in the specific embodiments disclosed without departing from the intended scope of the invention.

What is claimed is:

1. A neutronic reactor comprising, in combination, a chamber, a mass of liquid neutron moderator material disposed therein, means defining spaced vertical fluid-tight channels extending therethrough, a closure plate affixed to the top of each of the channels, said plate including depending support means, a plurality of spaced members attached at their upper extremities to the support means including material fissionable by neutrons of thermal energy, and means to circulate a fluid coolant through the channels.

2. A neutronic reactor comprising, in combination, a chamber, a body of heavy water disposed within the chamber, means defining a plurality of spaced vertical fluid-tight channels traversing said chamber including thermal insulation disposed between the channels and the liquid moderator, natural uranium fuel elements disposed within each of the channels, said fuel elements comprising a plurality of spaced parallel vertical plates, and means to cool the fuel elements by circulating a fluid coolant through the channels.

3. A neutronic reactor comprising a tank, a body of liquid moderator material disposed within the tank, a plurality of spaced fluid-tight vessels provided with channels therethrough disposed within said body of moderator material, a plurality of spaced parallel members supported within each of said vessels, said members including thermal-neutron-fissionable material, means to flow a fluid coolant through the vessels in heat exchange relationship with the members, and thermal insulation means disposed between the fluid coolant and the body of moderator material.

4. In a neutronic reactor, a fluid-tight container including a top wall, a body of heavy water disposed within said container, a plurality of spaced channeled elements secured to the top wall of the container and disposed within the body of heavy water, a plurality of units disposed within each element, each of said units comprising a support bar having notches in its upper edge, and a plurality of spaced vertical plates with openings receiving said bar, each plate being rigidly secured within a respective notch, said plates comprising thermal neutron fissionable material, and means for circulating coolant gas through said elements and between said plates in direct contact therewith.

5. A neutronic reactor comprising a chamber, a plurality of spaced fluid-tight channeled elements, a mass of liquid neutron moderator disposed around said elements in contact with the exterior surface thereof, thermal neutron fissionable material disposed within said elements, and means for circulating a fluid coolant through the channeled elements, each of said elements comprising spaced inner and outer walls and heat insulating means therebetween.

References Cited in the file of this patent

UNITED STATES PATENTS

| | | |
|---|---|---|
| 2,018,395 | Bower | Oct. 22, 1935 |
| 2,315,443 | McNitt | Mar. 30, 1943 |
| 2,708,656 | Fermi et al. | May 17, 1955 |
| 2,736,696 | Wigner et al. | Feb. 28, 1956 |
| 2,773,823 | Goett | Dec. 11, 1956 |
| 2,807,581 | Fermi et al. | Sept. 24, 1957 |

FOREIGN PATENTS

| | | |
|---|---|---|
| 114,150 | Australia | May 2, 1940 |
| 861,390 | France | Oct. 28, 1940 |
| 233,011 | Switzerland | Oct. 2, 1944 |

OTHER REFERENCES

Business Week, September 1, 1945, pp. 58–64.
Kelly et al.: Phy. Rev. 73 1135–9 (1948).